US006861958B2

(12) United States Patent
Kasagi

(10) Patent No.: US 6,861,958 B2
(45) Date of Patent: Mar. 1, 2005

(54) SHORT RANGE RADIO CONTINUOUS COMMUNICATION METHOD AND SYSTEM

(75) Inventor: Ken Kasagi, Tokyo (JP)

(73) Assignee: NEC Corporation, Tokyo (JP)

( * ) Notice: Subject to any disclaimer, the term of this patent is extended or adjusted under 35 U.S.C. 154(b) by 414 days.

(21) Appl. No.: 09/975,004

(22) Filed: Oct. 12, 2001

(65) Prior Publication Data

US 2002/0047786 A1 Apr. 25, 2002

(30) Foreign Application Priority Data

Oct. 25, 2000 (JP) ....................................... 2000-325407

(51) Int. Cl.[7] .......................... G08G 1/00; G08G 1/065; G08B 21/00; H04Q 5/22

(52) U.S. Cl. ........................ 340/928; 340/540; 340/10.2

(58) Field of Search ................................ 340/10.2, 928; 370/331, 336, 338, 347

(56) References Cited

U.S. PATENT DOCUMENTS

| | | | | | |
|---|---|---|---|---|---|
| 5,554,984 | A | * | 9/1996 | Shigenaga et al. | 340/937 |
| 5,686,906 | A | * | 11/1997 | Ono et al. | 340/928 |
| 6,081,718 | A | * | 6/2000 | Ando et al. | 455/447 |
| 6,661,352 | B2 | * | 12/2003 | Tiernay et al. | 340/928 |

FOREIGN PATENT DOCUMENTS

| | | |
|---|---|---|
| CA | 2070990 | 5/1992 |
| EP | 0984639 A2 | 8/2000 |
| JP | 9-238104 | 9/1997 |
| JP | 10-23505 | 1/1998 |
| JP | 11-288472 | 10/1999 |
| JP | 2000-115055 | 4/2000 |
| JP | 2000-253449 | 9/2000 |
| KR | 2000-0056043 | 9/2000 |

* cited by examiner

*Primary Examiner*—Michael Horabik
*Assistant Examiner*—Scott Au
(74) *Attorney, Agent, or Firm*—Foley & Lardner LLP

(57) ABSTRACT

To obtain a communication method which makes it possible to perform continuously communication through roadside antennas alternately arranged for a time sharing operation. Roadside antennas are arranged so that communication ranges are suitably overlapped for making the time sharing operation possible, and an on-vehicle device searches a communication frame from an adjacent next antenna during the communication with one of the roadside antennas at the overlapping point, and in the case where an FCMS can continuously be received, a switching from the communicating antenna to the adjacent antenna is instantaneously performed to make it possible to continue the communications between the roadside devices and the on-vehicle device.

13 Claims, 7 Drawing Sheets

SHORT RANGE RADIO CONTINUOUS COMMUNICATION METHOD AND SYSTEM

BACKGROUND OF THE INVENTION

1. Field of the Invention

The present invention relates to a DSRC system that is a short range radio continuous communication system considered as an important technique for supporting Intelligent Transport Systems (ITS).

2. Description of the Related Art

The short range radio communication (hereafter, referred to as DSRC (Dedicated Short Range Communication)) system will be described below.

An example of a communication frame used in the DSRC is shown in FIG. 8A and FIG. 8B. In the case of the full-duplex communication system, there are two kinds of periods: 3.91 ms and 2.34 ms as the period of the frame, and either frame is applied according to the size of the communication range. The transmitting and receiving slot allocation information in each frame is stored in a FCMS (Frame Control Message Slot) that is the head slot of the frame, and on the basis of this information, a roadside device and an on-vehicle device perform the transmitting and receiving of data by using a MDS (Message Data Slot).

The concrete operation of the DSRC will be described by taking the ETC (Electronic Toll Collection) as an example. In the case of the ETC, the number of roadside devices to be provided is different depending on the tollgate. First of all, an example of the exit tollgate is shown.

An example of the configuration of the roadside device at the exit tollgate is shown in FIG. 4. The roadside device comprises: an application processing section 214 which performs an application processing of the ETC that is a non-stop toll collection system of a toll calculation or the like; a roadside antenna 201 which performs the radio communication by using a frequency of 5.8 GHz with the on-vehicle device; a high frequency section 211 which down-converts a signal of 5.8 GHz from the roadside antenna 201 and makes it a base band signal, and which up-converts a base band signal to 5.8 GHz on the contrary; a base band section 212 which performs a generation of a communication frame, a generation of transmitting data, and an error check of receiving data or the like; and a DSRC control section 213 which performs a DSRC protocol processing on the basis of signals from the application processing section 214 and the base band section 212.

Next, the configuration of the on-vehicle device is shown in FIG. 7. The on-vehicle device comprises: an application processing section 405 which performs a toll accounting notice to a driver and a toll accounting information writing to an IC card or the like; an on-vehicle antenna 401 which performs the radio communication by using a frequency of 5.8 GHz with the roadside antenna; a high frequency section 402 which down-converts a signal of 5.8 GHz from the on-vehicle antenna 401 and makes it a base band signal, and which up-converts a base band signal to 5.8 GHz on the contrary; a base band section 403 which searches or monitors the FCMS from the roadside antenna and performs a synchronization of the communication frame, and which performs a generation of transmitting data and an error check of receiving data or the like; and a DSRC control section 404 which performs the DSRC protocol processing on the basis of signals from the application processing section 405 and the base band section 403.

An example of the exit tollgate is shown in FIG. 3A and FIG. 3B. At the exit tollgate, one roadside device is provided in the direction of movement of the vehicle. When started, the on-vehicle device 203 searches the FCMS from the roadside antenna 201 at all times. When the on-vehicle device 203 enters a communication range 202 of the roadside antenna 201, it starts to receive the FCMS from the roadside antenna 201, and if it continuously and normally receives the FCMS, it issues a request of link establishment to the roadside antenna 201, and performs a accounting process of an expressway toll or the like.

On the other hand, at the entrance tollgate, for the processing of the detection of the information on the type of a vehicle or the like, two roadside devices are provided in the direction of movement of the vehicle. An example of the entrance tollgate is shown in FIG. 5A and FIG. 5B. By the radio communication between the on-vehicle devices 303, 306 and the first roadside antenna 301 that is the front roadside antenna in the opposite direction of movement of the vehicle and the second roadside antenna 304 that is the rear antenna, the receiving and transmitting of the entrance information and the information on the type of a vehicle are performed. The above described two antennas (the first roadside antenna 301 and the second roadside antenna 304) are provided adjacently, and therefore, there is a possibility of causing a communication obstacle because of the radio wave interference. Therefore, in the case where the configuration shown in FIG. 5A is adopted, as shown in FIG. 5B, the communication frames are alternately operated. This action where communication frames are alternately operated by the front and rear antennas is called the time sharing operation.

An example of the configuration of two roadside devices at the entrance tollgate is shown in FIG. 6. Similarly to the example at the exit tollgate, each of two roadside devices comprises: antenna sections 301 and 304; high frequency sections 321 and 331; base band sections 322 and 332; an application processing section 324; and DSRC control sections 323 and 333. The application processing section 324 is connected to both the DSRC control sections 323 and 333 to perform a series of processing as an application.

Furthermore, the DSRC control sections 323 and 333 are synchronized by receiving and transmitting a synchronizing signal 341, and the operation of the communication frames is performed so that at the timing when one roadside device communicates, the other stops.

Next, the concrete processing at the entrance tollgate will be described by referring to FIGS. 5A, 5B and FIG. 6. FIG. 5A is a drawing showing the communication range, and FIG. 5B is a drawing showing the communication frame. At the timing when the first roadside antenna 301 operates, the first roadside antenna 301 and the on-vehicle device 303 in the communication range 302 of the first roadside antenna 301 perform the communication by the communication frame 311 of the first roadside antenna 301, and during that period, the second roadside antenna 304 and the on-vehicle device 306 in the communication range 305 of the second roadside antenna 304 do not perform the communication (timing of the stopping frame 314 of the second roadside antenna 304).

Similarly, at the timing when the second roadside antenna 304 and the on-vehicle device 306 perform the communication by the communication frame 313, the first roadside antenna 301 and the on-vehicle device 303 are in the timing of the stopping frame 312, and do not perform the communication. Thus, in the case of two adjacent antennas, the interference of the radio wave is avoided by using the time sharing operation where at the timing when one performs the communication, the other does not perform the communication at all.

Next, the operation of the on-vehicle device will be described in detail. When started, the on-vehicle device enters the FCMS search mode to attempt the receiving of the FCMS from the roadside antenna.

When the on-vehicle device succeeds in the receiving of the FCMS, it attempts the receiving of the FCMS again, and if it continuously succeeds in the receiving of the FCMS, it moves to the FCMS monitoring mode. At the FCMS monitoring mode, the timing of receiving the FCMS is fixed, and whether the FCMS can normally be received at the fixed timing or not is monitored.

In the FCMS monitoring mode, when the on-vehicle device continuously fails in the normal receiving of the FCMS, it releases the fixing of the FCMS receiving timing, and returns again to the mode of searching the FCMS.

When taking the above described entrance tollgate as an example, the above described action is as follows. In FIG. 5A, the on-vehicle device 303 enters the communication range 302 of the first roadside antenna 301 while operating in the FCMS search mode. The boundary area of the communication range 302 is an area where the radio wave is unstable, and hence the on-vehicle device 303 repeats the action of succeeding in or failing in the receiving of the FCMS, and becomes in the state where it enters the FCMS search mode or enters the FCMS monitoring mode.

When the on-vehicle device 303 advances to enter the communication range 302, the area becomes an area where the radio wave is stable, and it becomes possible to stably and normally receive the FCMS, and therefore, the mode becomes the FCMS monitoring mode. After that, furthermore advancing to the area to come out of the communication range 302, the area becomes an area where the radio wave is unstable again, and similarly to the time of entering, the FCMS search mode and the FCMS monitoring mode are repeated. Finally, the FCMS from the first roadside antenna 301 cannot arrive at all, and the on-vehicle device 303 returns again to the FCMS search mode.

In the case of a system where roadside antennas are arranged in a line in the direction of movement of the vehicle on an expressway or the like, and the DSRC is continuously performed during the period when a vehicle runs on the expressway, as described above, the on-vehicle device performs the communication with one antenna, and continues the communication as long as it can normally perform the communication with that antenna. If it becomes impossible to normally perform the communication with that antenna, the on-vehicle device once resets the state, and searches a roadside antenna with which it can normally perform the communication. Therefore, at the boundary area where the on-vehicle device enters the communication range of the next antenna from the communication range of a certain antenna, the communication is inevitably interrupted.

Furthermore, the method of providing the roadside antennas is also difficult. If the roadside antennas are provided so that the communication ranges are overlapped onto each other, an interference of the radio wave is caused at the overlapped part, and it becomes impossible to perform the normal communication, and the communication is interrupted. On the contrary, if the roadside antennas are provided with a distance to avoid the interference, it also becomes impossible to normally perform the communication at the part where a space is made, and the communication is interrupted.

SUMMARY OF THE INVENTION

An object of the present invention is to provide an environment where the communication can continuously be performed between the roadside devices and the on-vehicle device by using the DSRC.

According to the first aspect of the present invention, a short range radio communication method, in which a DSRC (Dedicated Short Range Communication) that is a short range radio communication used for an ETC (Electronic Toll Collection) that is a non-stop toll collection system is applied, and roadside antennas that are provided at a roadside are continuously arranged, and time sharing operation is performed by synchronizing sending timing of a communication frame in all of said roadside antennas, comprises:

a step for receiving a communication frame transmitted from an adjacent roadside antenna during the communication with one of said roadside antennas in an on-vehicle device which is a radio set mounted on a vehicle and performs the communication with said roadside antennas.

According to the second aspect of the present invention, a short range radio communication system, in which a DSRC (Dedicated Short Range Communication) that is a short range radio communication used for an ETC (Electronic Toll Collection) that is a non-stop toll collection system is applied, and roadside antennas that are provided at a roadside are continuously arranged, and time sharing operation is performed by synchronizing sending timing of a communication frame in all of said roadside antennas, comprises:

an on-vehicle device which is a radio set mounted on a vehicle and performs the communication with said roadside antennas, wherein said on-vehicle device includes means for receiving a communication frame transmitted from an adjacent roadside antenna during the communication with one of said roadside antennas.

In order to solve the above described problems, in the case of the present invention, when antennas are continuously arranged in the direction of movement of the vehicle, they are arranged so that the communication ranges of the front and rear antennas are overlapped onto each other, and that the adjacent antennas perform the time sharing operation with each other. In the case of the time sharing operation, at the timing of stopping, the on-vehicle device is not arranged to wait for the next timing and stop, but arranged to search the FCMS from the next antenna. If the on-vehicle device can correctly detect the FCMS of the frame from the adjacent antenna continuously several times, it performs a processing for switching the roadside antenna that is the partner of the communication, to the adjacent roadside antenna. By doing so, it is possible to continuously perform the communication between the roadside antennas and the on-vehicle device.

Furthermore, the roadside antennas are arranged so that the communication ranges are overlapped onto each other, and the operation is performed by the time sharing, and accordingly, not only the communication is performed with a certain roadside antenna, but also the roadside antenna that is the partner of the communication is instantaneously switched, and consequently, the communication can continuously be performed, in the case where the FCMS from the adjacent antenna is searched at the timing of stopping, and it can be judged that the communication channel with the adjacent antenna is stable.

BRIEF DESCRIPTION OF THE DRAWINGS

FIG. 8 shows examples of a conventional communication frame used in the DSRC.

DESCRIPTION OF THE PREFERRED EMBODIMENTS

A first embodiment of a short range radio communication system of the present invention will be described by referring to FIG. 1.

Figure 1A:
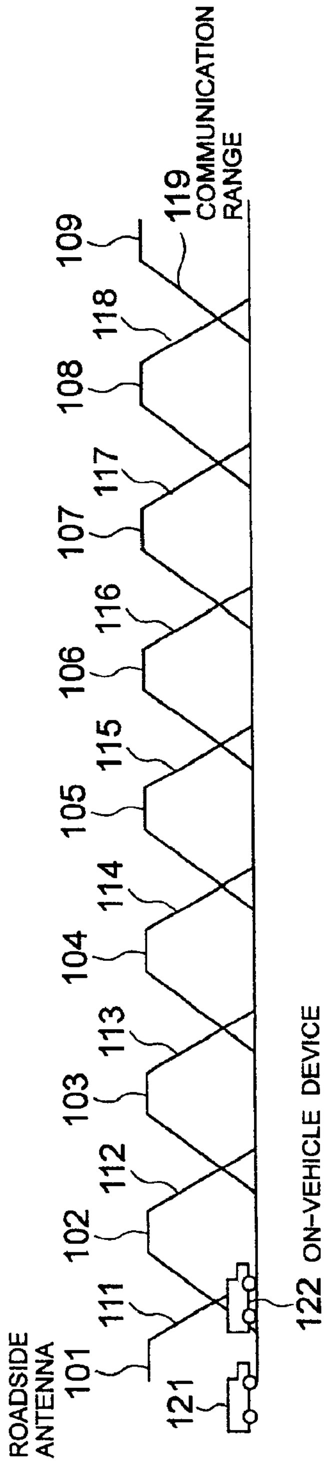
FIG. 1A is a drawing showing an overlapping of communication ranges of roadside antennas according to an example of a first embodiment of a short range radio continuous communication system of the present invention.
Figure 1B:
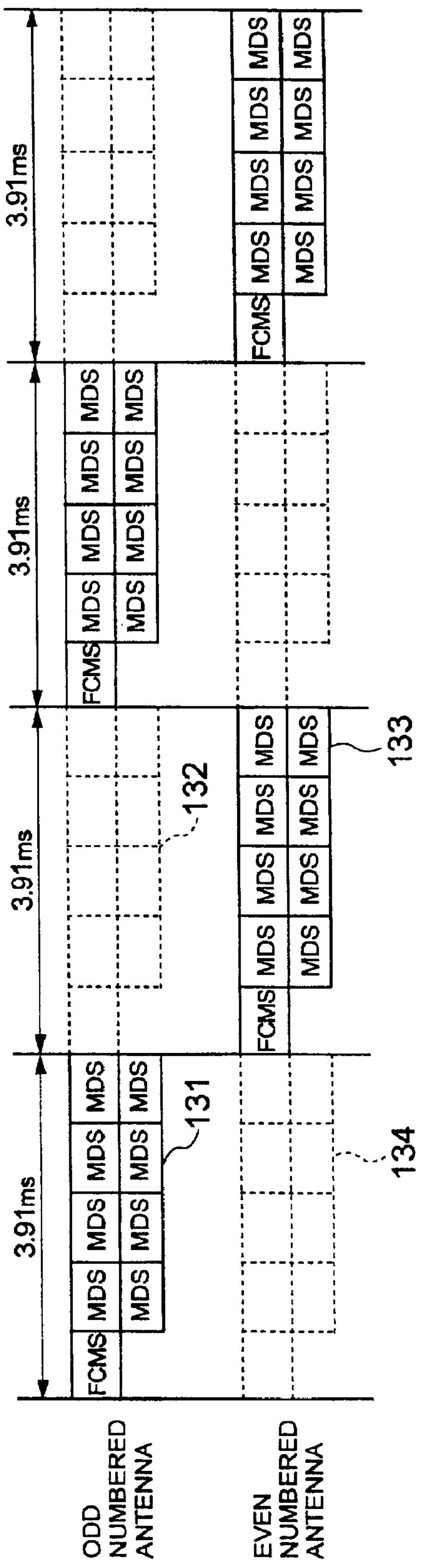
FIG. 1B is a drawing showing a configuration of a communication frame.

FIG. 1A is a drawing showing an overlapping of communication ranges of roadside antennas of the short range radio communication system of the present invention, and FIG. 1B is a drawing showing a communication frame used in a DSRC of the present invention. As shown in FIG. 1A, the roadside antennas are arranged continuously in the direction of movement of the vehicle so that the communication range of each roadside antenna is overlapped onto the communication range of an adjacent roadside antenna. All these roadside antennas are operated by the time sharing. Each roadside antenna and the adjacent antenna transmit the communication frame alternately.

In the case of the present invention, as described above, the roadside antennas are arranged so that the communication ranges are overlapped onto each other, and all are operated by the time sharing. First of all, the on-vehicle device starts the communication with the nearest roadside antenna. Since the communication frame is operated by the time sharing, the communicating timing and the stopping timing come alternately. In the case of the present invention, at the communicating timing of the nearest roadside antenna, the on-vehicle device performs the transmitting and receiving of the data with that antenna, similarly to the prior art, but at the stopping timing of that antenna, it not only stops but also attempts to receive the FCMS at the timing when the FCMS from the adjacent antenna is transmitted. If the FCMS can continuously and normally be received at the stopping timing of that antenna, the on-vehicle device judges that it has entered the area where the communication can stably be performed with the adjacent roadside antenna, and starts the communication with the adjacent roadside antenna. By doing this, it becomes possible to continuously perform the communication between the roadside devices provided corresponding to the roadside antennas and the on-vehicle device.

Next, the example of the first embodiment of the present invention will be described by referring to FIGS. 1A, 1B. As shown in FIG. 1A, the roadside antennas 101 to 109 are arranged so that the areas of the respective roadside antennas (communication ranges 111 to 119) where the communication can stably be performed, are overlapped. The roadside antennas 101 to 109 are operated by the time sharing. In the case of FIG. 1A, when the roadside antennas 101, 103, 105, 107, 109 perform the communication by using the communication frame 131 shown in FIG. 1B, the roadside antennas 102, 104, 106, 108 are in the timing of a stopping frame 134, and transmit no radio wave. Consequently, the adjacent roadside antennas do not perform the communication with each other at the same time, and therefore, the interference of the radio wave is not caused.

Figure 2:
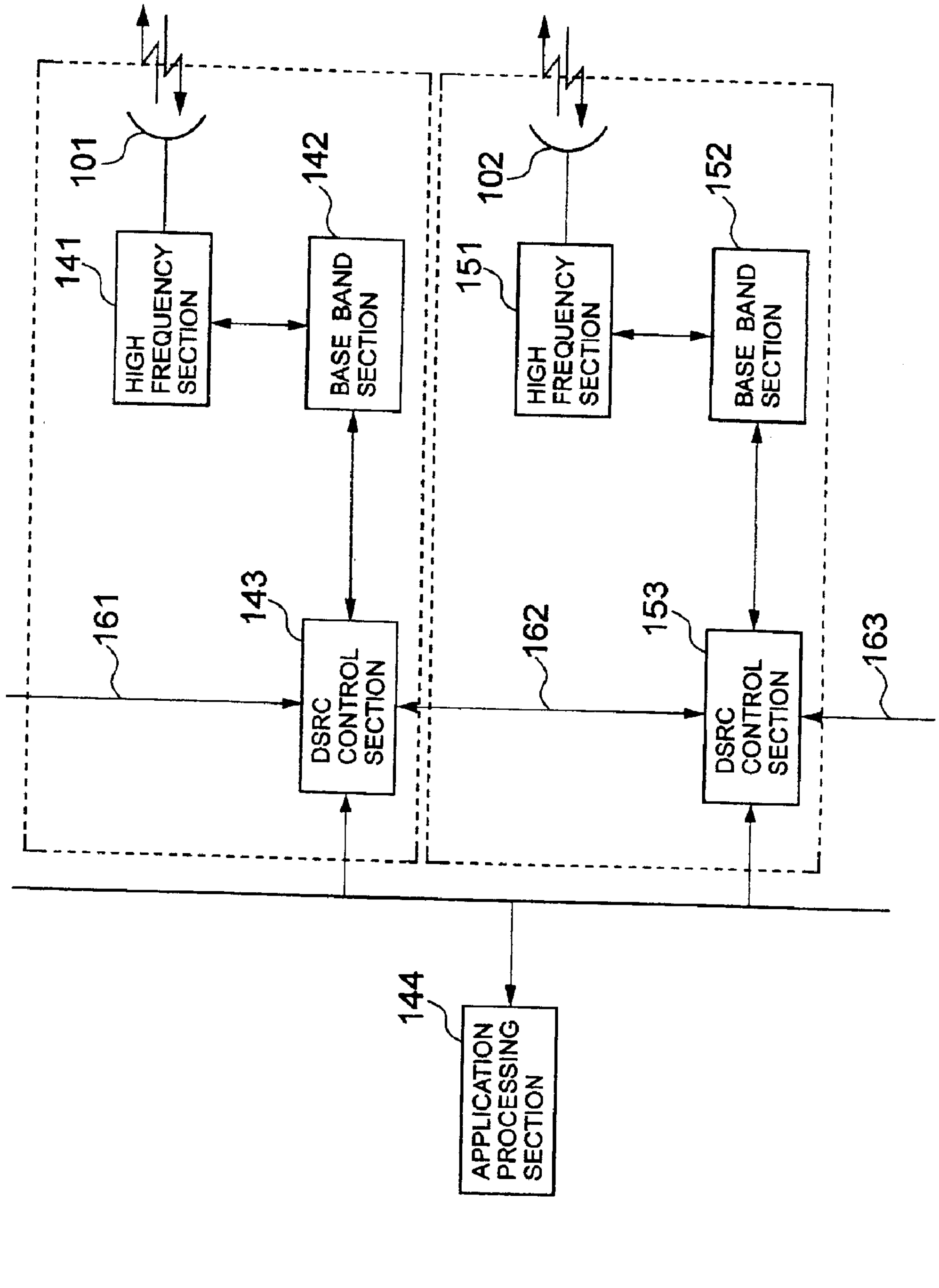
FIG. 2 is a block diagram showing a configuration of roadside devices according to an example of the first embodiment of the present invention.
Figure 3A:
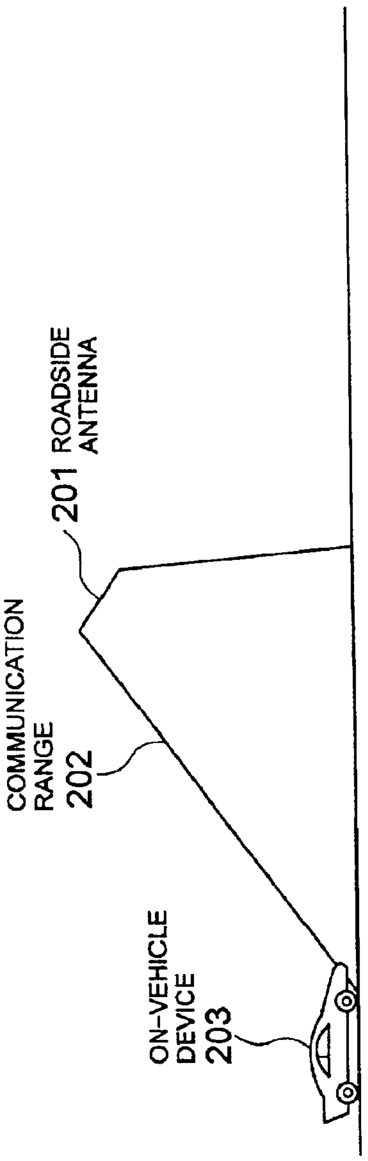
FIG. 3A shows an example of a communication range of a roadside antenna at an exit tolgate employed in the short range radio communication system.
Figure 3B:
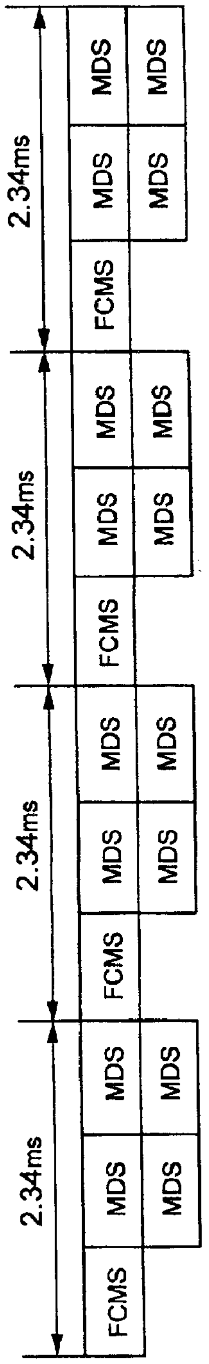
FIG. 3B is a drawing showing the frame configuration thereof.
Figure 4:
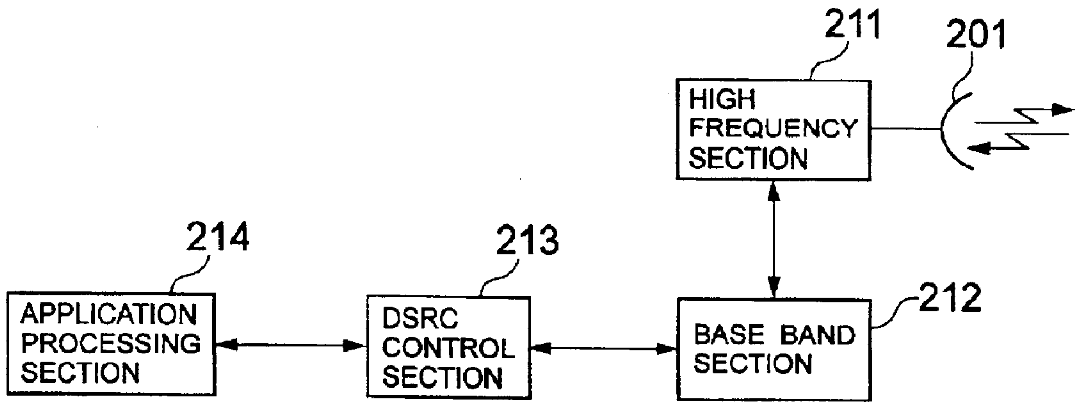
FIG. 4 is a block diagram of a conventional roadside device provided at the exit tollgate.
Figure 5A:
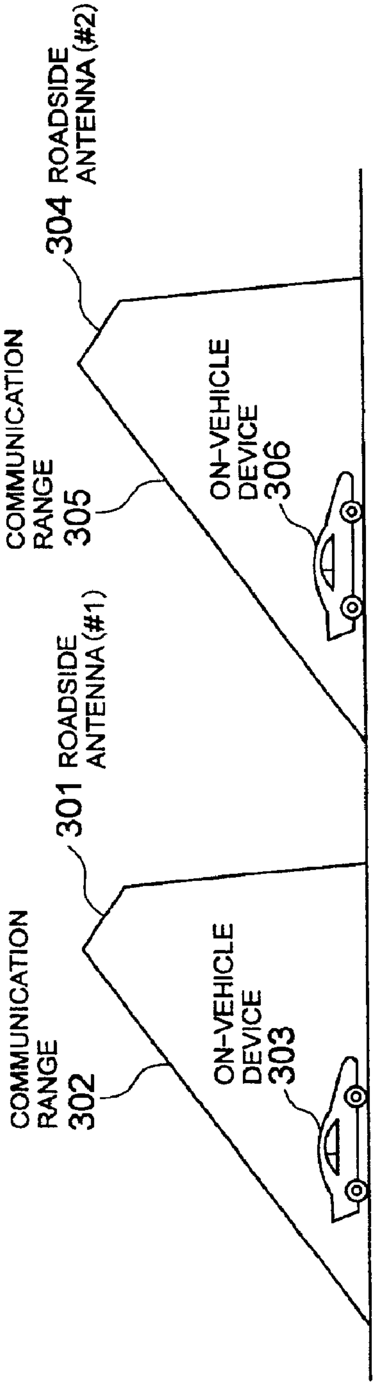
FIG. 5A is a drawing showing communication ranges of roadside antennas at an entrance tollgate.
Figure 5B:
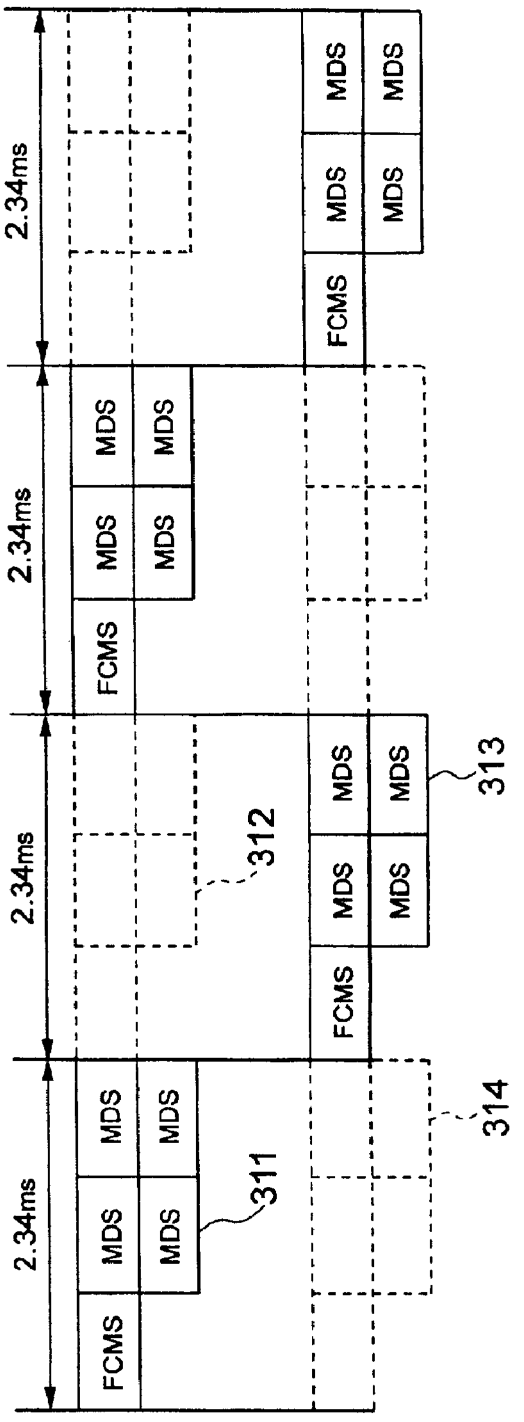
FIG. 5B is a drawing showing an example of the configuration of the communication frame thereof.
Figure 6:
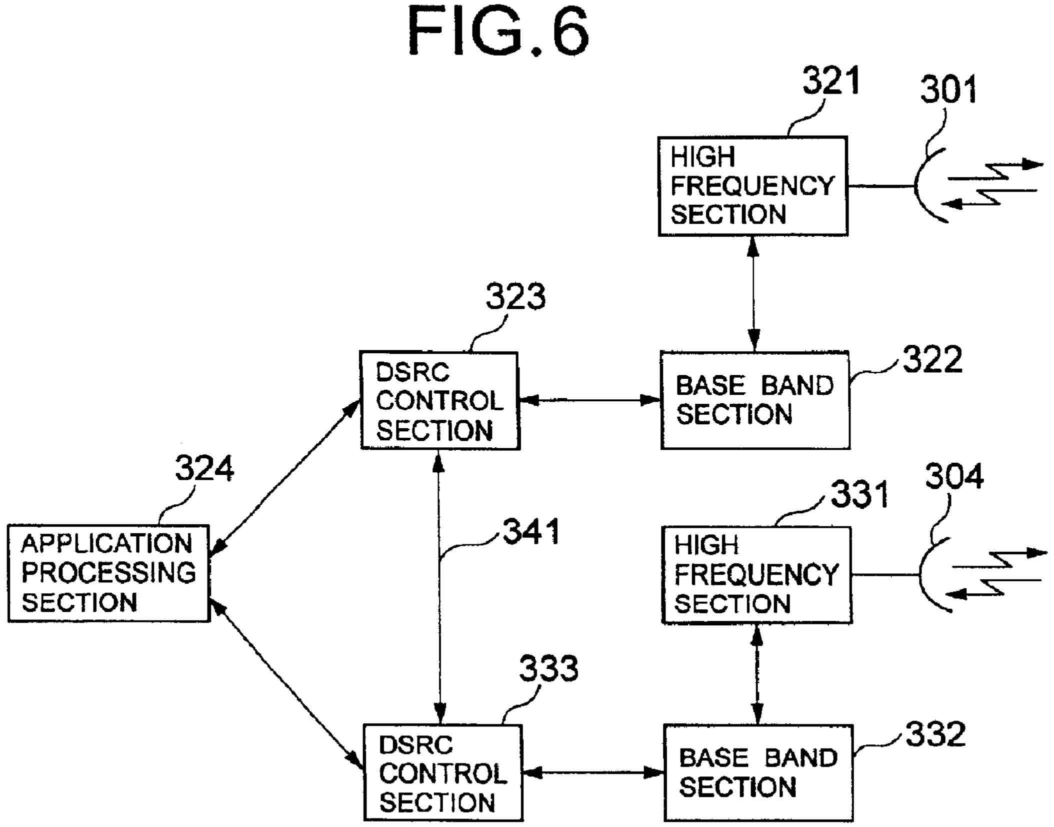
FIG. 6 is a block diagram showing a connecting state of two roadside devices provided at the entrance tollgate.
Figure 7:
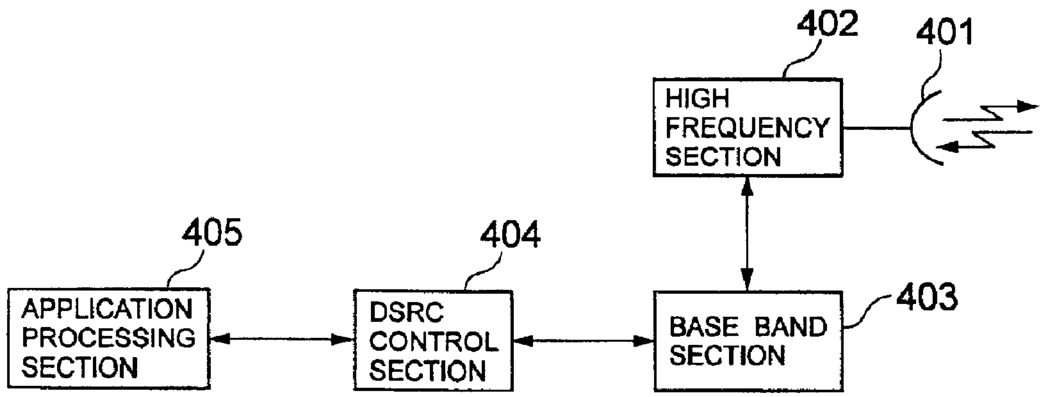
FIG. 7 is a conventional block diagram of an on-vehicle device in a DSRC system.
Figure 8A:
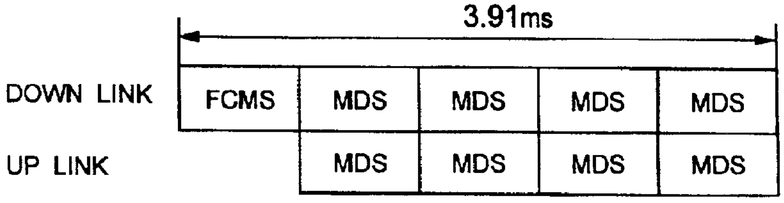
FIG. 8A is a drawing showing a used frame for 3.91 ms.
Figure 8B:
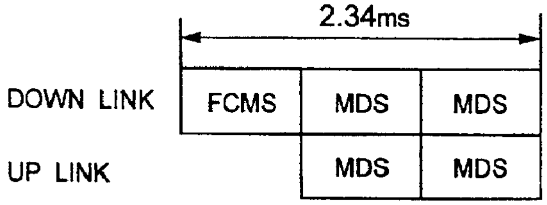
FIG. 8B is a drawing showing a used frame for 2.34 ms.

An example of the detailed configuration of the roadside devices arranged corresponding to the roadside antennas is shown in FIG. 2. In FIG. 2, the description will be given by taking the roadside devices shown by the roadside antennas 101 and 102 shown in FIG. 1A as examples. Actually, roadside devices with the similar configuration are connected. Similarly to the case of an example of the ETC, the roadside devices comprise: antenna sections (roadside antennas) 101 and 102; high frequency sections 141 and 151; base band sections 142 and 152; an application processing section 144; and DSRC control sections 143 and 153.

The application processing section 144 performs the transmitting and receiving of the data with all DSRC control sections, and performs the processing as the application. The DSRC control sections 143 and 153 are synchronized by using the synchronizing signals (synchronizing signals 161, 162, and 163 in the example in FIG. 2) with the adjacent DSRC control sections, and consequently, they operate to stop at the timing when the adjacent roadside devices transmit the communication frame.

The operation of the example will be described by using FIG. 1. In FIGS. 1A and 1B, the on-vehicle device 121 exists in the communication range 111 of the roadside antenna 101, and performs the communication with the roadside antenna 101. For example, if the roadside antenna 101 and the on-vehicle device 121 perform the communication by using the communication frame 131, the roadside antenna 102 that is the next roadside antenna in the direction of movement of the vehicle performs the communication by using the communication frame 133. At the timing of the communication frame 131, the roadside antenna 102 becomes in the stopping frame 134, and does not transmit the communication frame. On the contrary, at the timing of the communication frame 133, the roadside antenna 101 similarly becomes in the stopping frame 132, and does not transmit the communication frame.

Here, the on-vehicle device 121 which performs the communication with the roadside antenna 101 attempts to receive the FCMS of the communication frame 133 at the timing of the stopping frame 132 after performing the communication by the communication frame 131. The above described action is similar in the case of the on-vehicle device 122. The on-vehicle device 121 exists in the communication range 111 of the roadside antenna 101, and does not exist in the communication range 112 of the roadside antenna 102, and therefore, it cannot receive the FCMS (communication frame 133) from the roadside antenna 102, but the on-vehicle device 122 exists in the communication ranges of both the roadside antenna 101 and the roadside antenna 102, and therefore, it can receive both the communication frame 131 and the communication frame 133. The on-vehicle device 122 which has normally received the communication frame 133 attempts to receive the FCMS from the roadside antenna 102 after that, and if it continuously succeeds in normal receiving of the FCMS, it instantaneously switches the partner of the communication from the roadside antenna 101 to the roadside antenna 102. By doing this, it becomes possible to continuously perform the communication between the roadside devices and the on-vehicle device without any interrupting.

Figure 9:
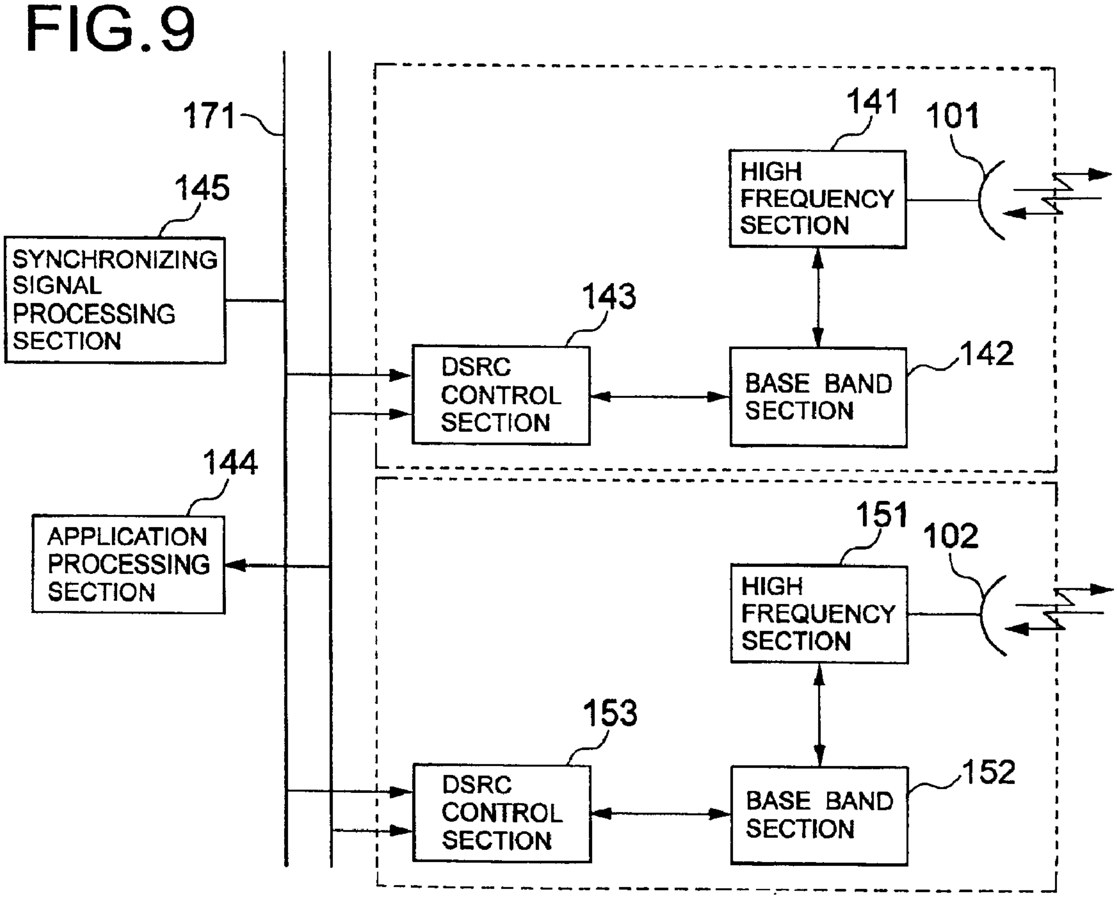
FIG. 9 is a block diagram showing a configuration of roadside devices according to an example of a second embodiment of the present invention.

Furthermore, FIG. 9 is a drawing showing a second embodiment of the present invention, and the parts similar to those in FIG. 2 are denoted by the same reference numbers. In the case of FIG. 9, the signal 171 for the synchronization of each DSRC control section is issued from a synchronizing signal control section 145 to each DSRC control section to synchronize all DSRC control sections. The similar effect can also be obtained by this structure.

As described above, the present invention makes it possible to continuously perform the communication without interrupting between the on-vehicle device mounted on a running vehicle and the roadside antennas (roadside devices) by using the DSRC and by performing the continuous selection of the roadside antennas of the time sharing operation, and it has such an advantageous effect that it is possible to provide various information for supporting the driving, and to provide various services such as the internet connection from the inside of a vehicle.

Moreover, according to the present invention, the communication contents which are concurrently taken in the communicating frame from the comminicating roadside antenna and the communication frame from the adjacent roadside antenna can be mutually different communication contents.

What is claimed is:

1. A short range radio communication method, in which a DSRC (Dedicated Short Range Communication) that is a short range radio communication used for an ETC (Electronic Toll Collection) that is a non-stop toll collection system is applied, and roadside antennas that are provided at a roadside are continuously arranged, and time sharing operation is performed by synchronizing sending timing of a communication frame in all of said roadside antennas, comprising:

a step for receiving a communication frame transmitted from an adjacent roadside antenna during the communication with one of said roadside antennas in an on-vehicle device which is a radio set mounted on a vehicle and performs the communication with said roadside antennas; and wherein said step comprises:

an FCMS detecting step for detecting an FCMS (Frame Control Message Slot) of the communication frame transmitted from said adjacent roadside antenna at stopping timing of the communicating roadside antenna; and a step for switching the communication from the communicating roadside antenna to the adjacent roadside antenna on the basis of results detected by said FCMS detecting step.

2. The short range radio communication method according to claim 1, wherein said roadside antennas are continuously arranged so that part of the effective communication range of each of said roadside antennas is overlapped onto the effective communication range of the adjacent roadside antenna, and said step is performed when said on-vehicle device exists in an overlapped part of said effective communication ranges.

3. The short range radio communication method according to claim 1, further comprising a DSRC control step for performing DSRC protocol processing in each of roadside devices, provided corresponding to said roadside antennas, wherein said time sharing operation is performed by practicing synchronization among all DSRC control steps.

4. A short range radio communication system, in which a DSRC (Dedicated Short Range Communication) that is a short range radio communication used for an ETC (Electronic Toll Collection) that is a non-stop toll collection system is applied, and roadside antennas that are provided at a roadside are continuously arranged, and time sharing operation is performed by synchronizing sending timing of a communication frame in all of said roadside antennas, comprising:

an on-vehicle device which is a radio set mounted on a vehicle and performs the communication with said roadside antennas, wherein said on-vehicle device includes means for receiving a communication frame transmitted from an adjacent roadside antenna during the communication with one of said roadside antennas; and wherein said receiving means comprises:

FCMS detecting means for detecting an FCMS (Frame Control Message Slot) of the communication frame transmitted from said adjacent roadside antenna at stopping timing of the communicating roadside antenna; and means for switching the communication from the communicating roadside antenna to the adjacent roadside antenna on the basis of results detected by said FCMS detecting means.

5. The short range radio communication system according to claim 4, wherein said roadside antennas are continuously arranged so that part of the effective communication range of each of said roadside antennas is overlapped onto the effective communication range of the adjacent roadside antenna, and said means receives the communication frame from the adjacent roadside antenna when said on-vehicle device exists in an overlapped part of said effective communication ranges.

6. The short range radio communication system according to claim 4, wherein each of roadside devices provided corresponding to said roadside antennas includes a DSRC control section for performing DSRC protocol processing, and said time sharing operation is performed by practicing synchronization among all DSRC control sections.

7. The short range radio communication system according to claim 4, wherein the communication contents which are concurrently taken in a communication frame from the communicating roadside antenna and a communication frame from the adjacent roadside antenna are mutually different communication contents.

8. A short range radio communication method for use in a DSRC (Dedicated Short Range Communication) system using an ETC (Electronic Toll Collection), said method comprising the steps of:

arranging a plurality of roadside antennas along a direction of travel of vehicles utilizing a roadway; said plurality of antennas spaced from one another in the direction of vehicle travel such that a given antenna among said plurality of antennas has a communication range along said direction of travel that overlaps with a communication range along said direction of travel of adjacent antennas among said plurality of antennas;

time sharing an operation of said plurality of roadside antennas by synchronizing sending timing of a communication frame in each of said plurality of roadside antennas; and receiving a communication frame transmitted from one of said adjacent roadside antennas during communication with said given one of said roadside antennas in an on-vehicle device which includes a radio set mounted on a vehicle for performing communication with said roadside antennas; and wherein said receiving step comprises:

detecting an FCMS (Frame Control Message Slot) of the communication frame transmitted from said adjacent roadside antenna at a stopping time interval of communication by said given roadside antenna; and switching the communication from the given roadside antenna to the adjacent roadside antenna on the basis of results said FCMS detecting.

9. The short range radio communication method according to claim 8, further comprising:

a DSRC control step for performing DSRC protocol processing in each of a plurality of roadside devices which are provided corresponding to said plurality of roadside antennas, and wherein said time sharing operation is performed by practicing synchronization among all of said plurality of roadside devices.

10. A short range radio communication system for use in a DSRC (Dedicated Short Range Communication) system using an ETC (Electronic Toll Collection), said system comprising:

a plurality of roadside antennas positioned along a direction of travel of a vehicle utilizing a roadway; said plurality of antennas spaced from one another in the direction of vehicle travel such that a given antenna among said plurality of antennas has a communication range along said direction of travel that overlaps with a communication range along said direction travel of at least one adjacent antenna among said plurality of antennas;

means for time sharing an operation of said plurality of roadside antennas by synchronizing sending timing of communication frames from said plurality of roadside antennas; and an on-vehicle device comprising a radio set mounted on said vehicle and performing communication with said plurality of roadside antennas, wherein said on-vehicle device includes means for receiving one of said communication frames transmitted from said given roadside antenna and for receiving another of said communication frames from said at least one adjacent antenna in a time share manner; and wherein said receiving means comprises:

detecting means for detecting an FCMS (Frame Control Message Slot) of the other communication frame transmitted from said at least one adjacent roadside antenna at a stopping time of said one communication frame from said given roadside antenna; and means for switching the communication from the given roadside antenna to the adjacent roadside antenna on the basis of results detected by said FCMS detecting means.

11. The short range radio communication system according to claim 10, wherein said receiving means receives the other communication frame from the adjacent roadside antenna when said on-vehicle device is present in an overlapped communication range of said given antenna with said at least one adjacent antenna.

12. The short range radio communication system according to claim 10, wherein each of said plurality of roadside antennas are provided with a device which includes a DSRC control section for performing DSRC protocol processing, and said time sharing operation is performed by synchronizing all of said DSRC control sections.

13. The short range radio communication system according to claim 10, wherein a communication content transmitted by said given antenna in said one communication frame is different from the communication content transmitted by said at least one adjacent antenna in said another communication frame.

* * * * *